(12) United States Patent
Fowe et al.

(10) Patent No.: US 11,781,869 B2
(45) Date of Patent: Oct. 10, 2023

(54) METHOD AND APPARATUS FOR PROVIDING AN INDOOR PEDESTRIAN ORIGIN-DESTINATION MATRIX AND FLOW ANALYTICS

(71) Applicant: HERE GLOBAL B.V., Eindhoven (NL)

(72) Inventors: James Fowe, Chicago, IL (US); Aditya Balasaheb Jadhav, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 72 days.

(21) Appl. No.: 17/150,728

(22) Filed: Jan. 15, 2021

(65) Prior Publication Data
US 2021/0164784 A1 Jun. 3, 2021

Related U.S. Application Data

(63) Continuation of application No. 16/574,889, filed on Sep. 18, 2019, now Pat. No. 10,921,130.

(51) Int. Cl.
*H04W 4/029* (2018.01)
*G01C 21/20* (2006.01)
(Continued)

(52) U.S. Cl.
CPC ....... *G01C 21/206* (2013.01); *G01C 21/3476* (2013.01); *G01S 19/46* (2013.01);
(Continued)

(58) Field of Classification Search
CPC ....... H04W 4/029; H04W 4/33; H04W 4/023; H04W 4/021; G01C 21/206;
(Continued)

(56) References Cited

U.S. PATENT DOCUMENTS 8,279,840 B2 10/2012 Walker, Sr.
8,838,376 B2 9/2014 Garin et al.
(Continued)

FOREIGN PATENT DOCUMENTS

WO 20190158803 A1 8/2019

OTHER PUBLICATIONS

You et al., "Phone-based Data Collection for Consumer Behavior Research", 2013, 20 pages.
(Continued)

*Primary Examiner* — Fred A Casca
(74) *Attorney, Agent, or Firm* — DITTHAVONG, STEINER & MLOTKOWSKI

(57) ABSTRACT

An approach is provided for creating an origin-destination matrix from probe trajectory data. The approach includes determining, via an outdoor positioning system, that at least one probe device has entered a point-of-interest (POI). The approach also includes initiating an indoor positioning system to determine indoor location data associated for the at least one probe device while the at least one device is within the POI. The approach further includes processing the indoor location data to generate an origin-destination (OD) matrix. The OD matrix represents an indoor movement of the at least one probe device among a plurality of sub-POIs located within the POI indicated by the indoor location data. The approach further includes providing the OD matrix as an output.

20 Claims, 13 Drawing Sheets

(51) Int. Cl.
  *H04W 4/33* (2018.01)
  *G01C 21/34* (2006.01)
  *G01S 19/46* (2010.01)
  *G01S 19/48* (2010.01)
  *H04B 7/06* (2006.01)
  *H04W 4/021* (2018.01)
  *H04B 7/0413* (2017.01)
  *H04B 7/0417* (2017.01)

(52) U.S. Cl.
  CPC ............ *G01S 19/48* (2013.01); *H04B 7/0697* (2013.01); *H04W 4/021* (2013.01); *H04W 4/029* (2018.02); *H04W 4/33* (2018.02); *H04B 7/0413* (2013.01); *H04B 7/0417* (2013.01)

(58) Field of Classification Search
  CPC ..... G01C 21/3476; G01S 19/46; G01S 19/48; H04B 7/0697; H04B 7/0413; H04B 7/0417; G06Q 30/0261
  See application file for complete search history.

(56) References Cited

U.S. PATENT DOCUMENTS

| | | | | |
|---|---|---|---|---|
| 10,003,925 | B1* | 6/2018 | Zhao | H04W 4/029 |
| 2009/0189810 | A1 | 7/2009 | Murray | |
| 2013/0253963 | A1* | 9/2013 | Harris | G06Q 30/02 |
| | | | | 705/14.1 |
| 2015/0262397 | A1 | 9/2015 | Eastman | |
| 2017/0309216 | A1* | 10/2017 | Jiao | G09G 3/2007 |
| 2018/0149754 | A1 | 5/2018 | Lu et al. | |
| 2018/0213363 | A1* | 7/2018 | Kim | H04W 4/029 |
| 2019/0011274 | A1* | 1/2019 | Carter | G01C 21/3484 |
| 2019/2274049 | | 7/2019 | Keith et al. | |
| 2019/0246242 | A1* | 8/2019 | Tamilin | H04W 16/14 |

OTHER PUBLICATIONS

Banin et al., "Wireless Indoor Localization Systems and Techniques: Survey and Comparative Study", published in Indonesian Journal of Electrical Engineering and Computer Science, vol. 3, No. 2, Aug. 2016, pp. 392-409.

Khudhair et al., "Next Generation Indoor Positioning System Based on Wifi Time of Flight", Published in Proceedings of the 26th International Technical Meeting of the Satellite Division of the Institute of Navigation (ION GNSS+ 2013) Sep. 16-20, 2013, 8 pages.

Aloys et al., "A Model of Pedestrian Route Choice and Demand for Retail Facilities within Inner-City Shopping Areas", published in Geographical Analysis, vol. 18, No. 2, Apr. 1, 1986, pp. 115-128, 14 pages.

European Office Action for related European Patent Application No. 20196615.7-1001 dated Feb. 22, 2021, 9 pages.

Danya et al., "Inferring dynamic origin-destination flows by transport mode using mobile phone data", published in Transportation Research Part C: Emerging Technologies, vol. 101, Apr. 2019, 27 pages.

Tamas et al., "PFS method for pedestrian origin-destination surveys of enclosed areas", published in Transportation Research Procedia, vol. 27, 2017, pp. 680-687, 8 pages.

* cited by examiner

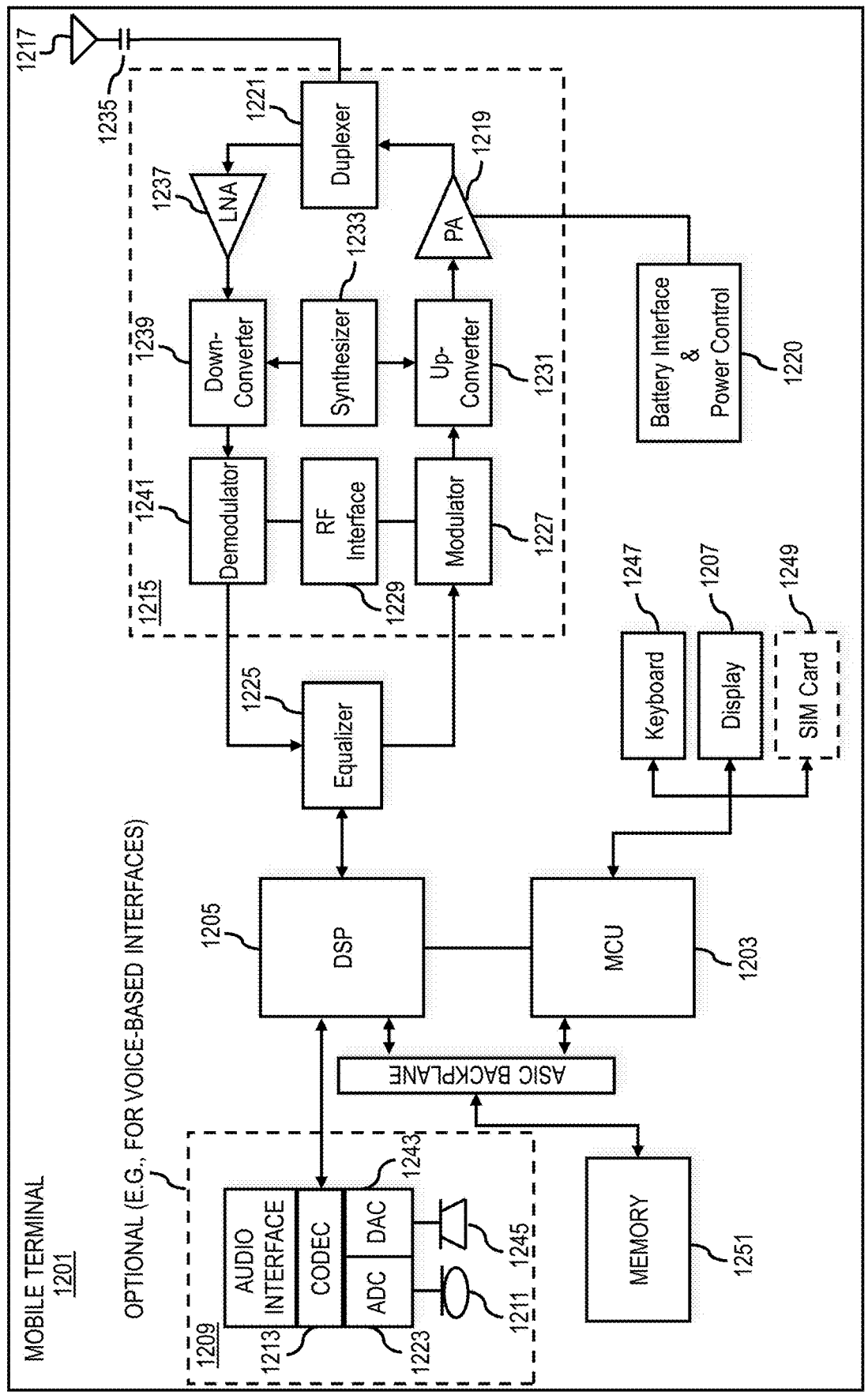

METHOD AND APPARATUS FOR PROVIDING AN INDOOR PEDESTRIAN ORIGIN-DESTINATION MATRIX AND FLOW ANALYTICS

CROSS-REFERENCE TO RELATED APPLICATIONS

This application is a continuation application of application Ser. No. 16/574,889 filed Sep. 18, 2019.

BACKGROUND

Location service providers often rely on probe data (e.g., GPS location data collected from probe devices or vehicles as they travel) to understand traffic flows, movements, etc. However, such probe data have historically been confined to separate domains for outdoor versus indoor probe data. This is because location data for outdoor probe application typically rely on location technologies such as Global Positioning System (GPS) or other similar satellite-based locations technologies which often do not work well in indoor situations. As a result, service providers face significant technical challenges to providing indoor pedestrian flow analytics that relate outdoor movements to indoor movements.

Some Example Embodiments

Therefore, there is a need for an approach for providing an origin-destination matrix using indoor probe location data, thereby recording pedestrian movement flows or probe trajectories from outdoor to indoor environments.

According to one embodiment, a method comprises determining, via an outdoor positioning system, that at least one probe device has entered a point-of-interest (POI). The method also comprises initiating an indoor positioning system to determine indoor location data associated for the at least one probe device while the at least one device is within the POI. The method further comprises processing the indoor location data to generate an origin-destination (OD) matrix, wherein the OD matrix represents an indoor movement of the at least one probe device among a plurality of sub-POIs located within the POI indicated by the indoor location data. The method further comprises providing the OD matrix as an output.

According to another embodiment, an apparatus comprises at least one processor, and at least one memory including computer program code for one or more computer programs, the at least one memory and the computer program code configured to, with the at least one processor, cause, at least in part, the apparatus to determine, via an outdoor positioning system, that at least one probe device has entered a point-of-interest (POI). The apparatus is also caused to initiate an indoor positioning system to determine indoor location data associated for the at least one probe device while the at least one device is within the POI. The apparatus is further caused to process the indoor location data to generate an origin-destination (OD) matrix, wherein the OD matrix represents an indoor movement of the at least one probe device among a plurality of sub-POIs located within the POI indicated by the indoor location data. The apparatus is further caused to provide the OD matrix as an output.

According to another embodiment, a computer-readable storage medium carries one or more sequences of one or more instructions which, when executed by one or more processors, cause, at least in part, an apparatus to determine, via an outdoor positioning system, that at least one probe device has entered a point-of-interest (POI). The apparatus is also caused to initiate an indoor positioning system to determine indoor location data associated for the at least one probe device while the at least one device is within the POI. The apparatus is further caused to process the indoor location data to generate an origin-destination (OD) matrix, wherein the OD matrix represents an indoor movement of the at least one probe device among a plurality of sub-POIs located within the POI indicated by the indoor location data. The apparatus is further caused to provide the OD matrix as an output.

According to another embodiment, an apparatus comprises means for determining, via an outdoor positioning system, that at least one probe device has entered a point-of-interest (POI). The apparatus also comprises means for initiating an indoor positioning system to determine indoor location data associated for the at least one probe device while the at least one device is within the POI. The apparatus further comprises means for processing the indoor location data to generate an origin-destination (OD) matrix, wherein the OD matrix represents an indoor movement of the at least one probe device among a plurality of sub-POIs located within the POI indicated by the indoor location data. The apparatus further comprises means for providing the OD matrix as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention. In one embodiment, the apparatus is further caused to present the justification message based on receiving user request following a presentation of the recommended maneuver and/or route.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 12 is a diagram of a mobile terminal (e.g., handset) that can be used to implement an embodiment of the invention.

DESCRIPTION OF SOME EMBODIMENTS

Examples of a method, apparatus, and computer program for providing an origin-destination matrix using indoor probe location data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
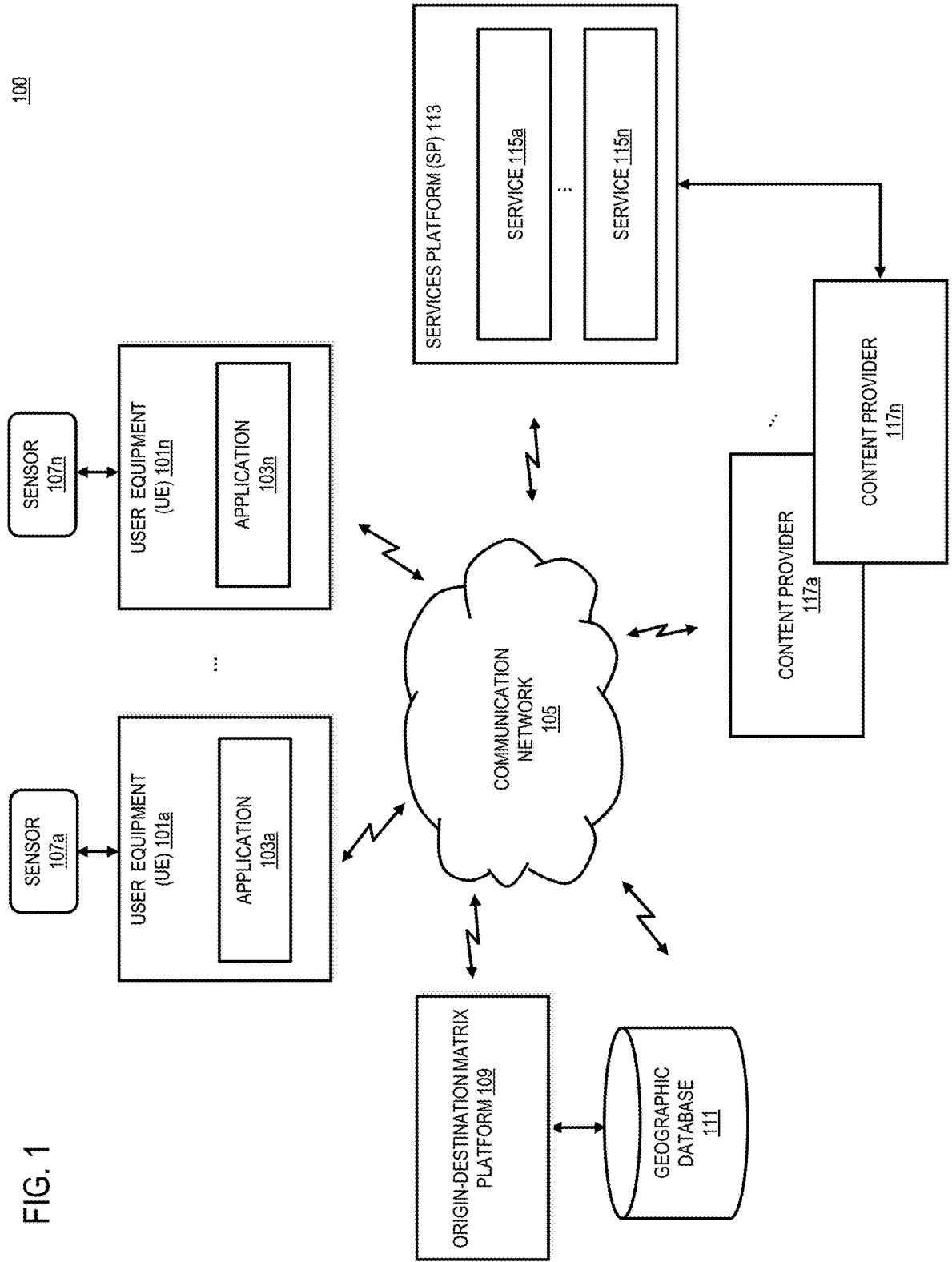
FIG. 1 is a diagram of a system capable of providing an origin-destination (OD) matrix using indoor probe location data, according to one embodiment.

FIG. 1 is a diagram of a system capable of providing an origin-destination matrix using indoor probe location data, according to one embodiment. Service providers can collect probe data generated by various probe devices (e.g., user devices 101a-101n) that can then be processed or analyzed to understand mobility patterns and preferences. When the UEs 101 (e.g., smartphones equipped with respective location sensors 107a-107n) are carried by pedestrians, the resulting probe data can be used as indicators of pedestrian flows or movements through geographic areas. By way of example, in one embodiment, probe data refers to location points (e.g., probe points) that indicate the sensed locations (e.g., latitude, longitude) of a particular probe device at a point in time. Typically, a probe point will include at least a probe identifier (ID), latitude, longitude, and timestamp indicating the time at which the probe point was sensed by the probe device's sensor 107 (e.g., a Global Positioning System (GPS) sensor or any other type of location sensor). In some embodiments, additional attributes can be included with each probe point including but not limited to a heading, altitude, and/or the like. The probe points for a unique probe ID can also be time-sequenced (e.g., based on timestamp data) to generate corresponding probe trajectories or paths.

As discussed above, probe devices or UEs 101 typically use GPS sensors or equivalent satellite-based positioning systems to generate probe data. However, because these satellite-based systems (e.g., outdoor positioning systems) rely on receiving signals from multiple satellites to triangulate an accurate position, outdoor positioning systems often do not work or otherwise have greatly decreased accuracy when used indoors. As a result, probe data has generally been provided just for outdoor locations where location data can be accurately sensed. This, in turn, limits the ability to perform indoor pedestrian flow analytics using traditional probe data.

To address this problem, a system 100 of FIG. 1 introduces the capability to provide an indoor origin-destination (OD) matrix that includes outdoor insight as part of the OD-modeling process. In other words, the system 100 can provide a pedestrian flow analytics product or service that ties indoor probe data to outdoor probe data to enable a new granularity of pedestrian flow analytics by spanning outdoor and indoor environments. In one embodiment, while GPS probes (or probes collected using any equivalent outdoor positioning technology) are the primary sensor 107 when tracking a UE 101 or probe device outdoors, the UE 101 can switch to an indoor an indoor positioning system (e.g., WiFi round-trip time (RTT) or equivalent indoor positioning system) when the UE 101 is indoors. The flow analytics (e.g., indoor OD generation) according to the embodiments described herein does a handshake between the outdoor and indoor positioning sensors 107 equipped on individual UEs 101 such that when the UE 101 traverses from outdoor to indoor, the mobility analytics or probe data for the UE 101 can still be captured. The handshake, for instance, can be any procedure that switches the task or collecting probe data from an outdoor positioning sensor to an indoor positioning sensor (or vice versa).

In one embodiment, the system 100 captures outdoor probe data (e.g., via an outdoor positioning system) for the UE 101 up to the point where the UE 101 enters into a point-of-interest (e.g., a building, other indoor structure, or any location where outdoor positioning is not available but indoor positioning is). On detecting that the UE 101 has entered the UE 101, the UE 101 automatically switches to an available indoor positioning system to generate indoor probe data for flow analytics. In one embodiment, the indoor flow analytics is represented using an OD matrix for the POI in which the UE 101 entered. The OD matrix can be constructed for each POI that contains multiple indoor POIs within the POI. An indoor-POI can also be referred to as a sub-POI or a child-POI of the POI in which the UE 101 entered. For example, a pedestrian can enter a mall (e.g., the main or major POI) that contains multiples stores, restaurants, etc. (e.g., indoor-POIs). Accordingly, the origins and destinations modeled in the matrix are the indoor-POIs within each major POI, thereby enabling the system 100 to determine pedestrians flows between the indoor-POIs or even other outdoor locations. The indoor OD matrix can be built by applying Dynamic Traffic Assignment on the indoor probe data to determine or predict which destination indoor-POIs a pedestrian is likely to move to from a given origin indoor-POI. In other words, the embodiments described herein capture one or more pedestrian movement flows via applying an OD matrix on pedestrian indoor location data with respect to sub-POIs within a POI. The OD matrix can be constructed with respect to a contextual parameter such as but not limited to a temporal parameter, activity parameter, etc. For example, if a temporal parameter is applied the indoor probe data can be analyzed over a period of time, such as a hour, several hours, lunch time, morning, afternoon, evening, a day of the week, weekend, a week, a month, a season, a year, etc. In this way, the system 100 can maintain and provide a full picture view of pedestrian movement flows in the entire POI as the pedestrian moves from outside the POI. For example, as shown in FIG. 4, an outdoor probe trajectory 401 on the right side, which may be tracked via common outdoor positioning systems, such as GPS.

Figure 4:
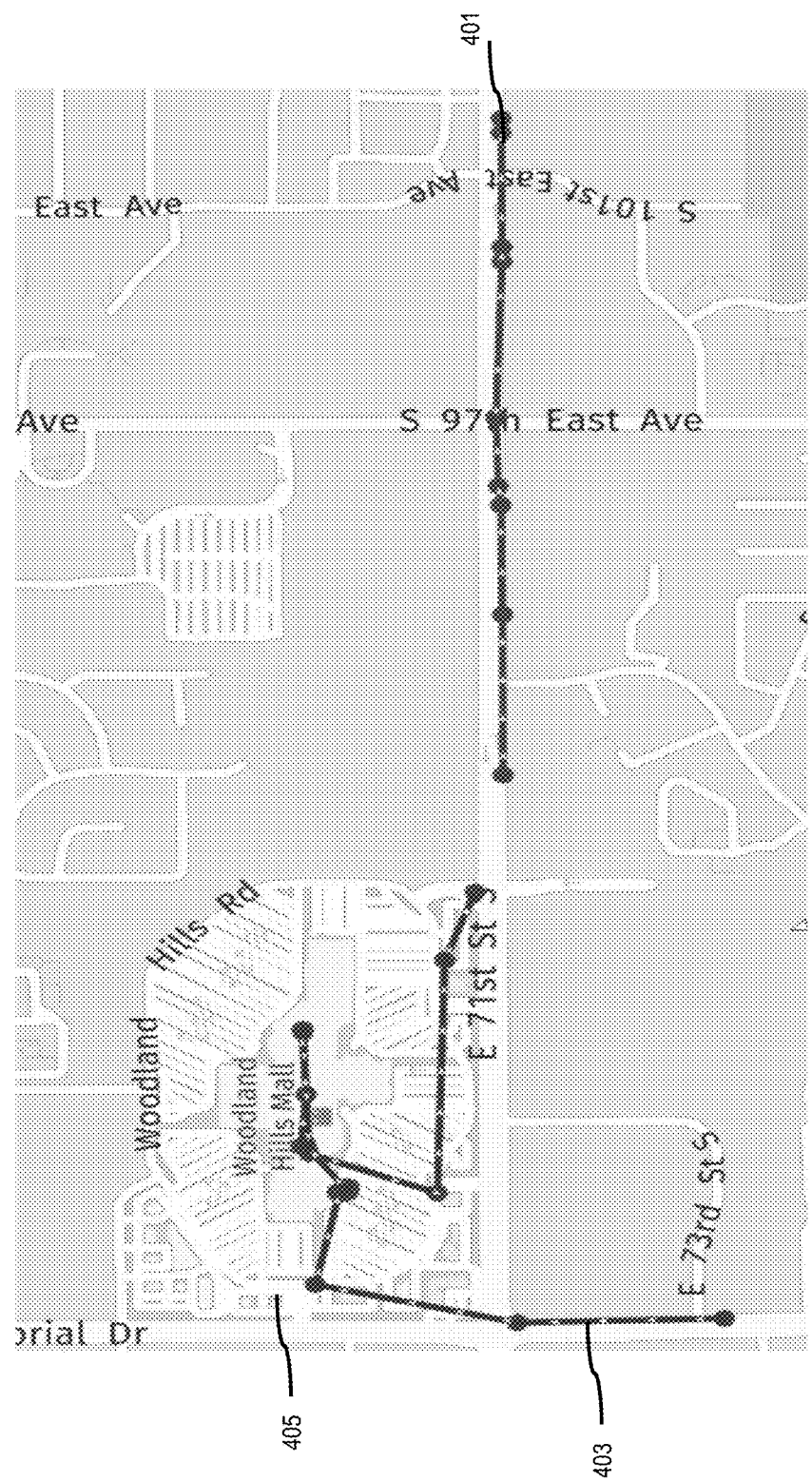
FIG. 4 is a diagram of two probe trajectories, according to one embodiment.

FIG. 4 is a diagram of two probe trajectories, according to one embodiment. On the other hand, an outdoor-to-indoor probe trajectory 403 on the right traversed into an indoor area (e.g., a mall 405), which can be tracked via common outdoor positioning systems, such as WIFI-RTT (details in FIG. 6). As it is well known that GPS signal is poor indoors. The system 100 provides a handshake between the outdoor positioning technology and the indoor positioning technology to track UE 101 as the UE 101 traverses from outside the POI to inside the POI.

Figure 5:
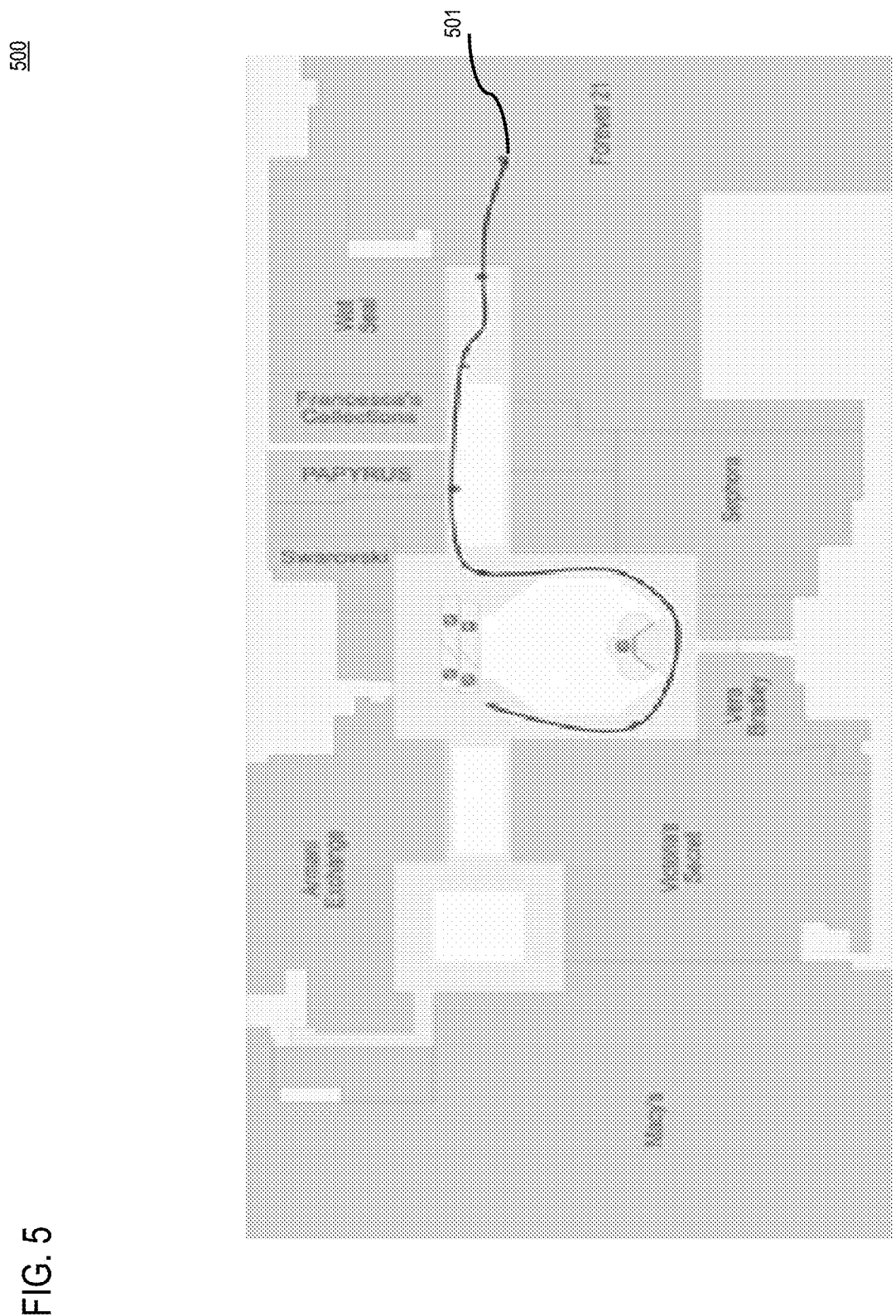
FIG. 5 is a diagram of a typical probe trajectory from origin to destination, according to one embodiment.

FIG. 5 is a diagram of a typical probe trajectory from origin to destination, according to one embodiment. A mall 500 contains an example probe trajectory path 501 wherein the probe trajectory path is denoted by a path line. The mall can be modeled by sub-POIs each with a defined border (e.g., geofence, cluster, etc.) and monitored, to capture as in-going movements into the mall 500, outgoing movements from the mall 500, internal movements within the mall 500, etc. The system 100 map-matches the indoor location data to indoor map data to determine the indoor movement of the at least one device. By way of example, the system 100 then matches the pedestrian indoor location data, such as the probe trajectory 501 traversing from outdoor to indoor, with a mall floor plan to identify the corresponding sub-POIs that pedestrian passed via and/or stopped at in the mall 500.

In addition to pedestrian indoor location data, the system 100 can generated the OD matrix with respect to at least one contextual parameter, such as a temporal parameter. For example, the system 100 can also track time spent at each stop made by the pedestrian. In one embodiment, the system 100 generates an index of the plurality of sub-POIs based on the OD matrix. The index is based on a time spent at each sub-POI of the plurality of sub-POIs as indicated by the OD matrix. The system 100 can generate reality index for sub-POIs based on time spent at the sub-POIs by the number of pedestrians. This will enable location-based product/service provision as well location-based advertisement. By way of example, the system 100 determines that single parents accompany their children in a small playground inside a mall courtyard for over 30 minutes, and recommends setting up an ice-cream booth and a candy shop next to the playground.

In one embodiment, the system 100 determining one or more clusters, one or more trajectories, or a combination thereof of the at least one probe device based on the indoor location data. The OD matrix is generated based on the one or more clusters, the one or more trajectories, or a combination thereof.

In one embodiment, the system 100 processes the OD matrix to rank the plurality of sub-POIs based on popularity.

In other embodiments, based on the indoor location data, the indoor movement flows, or a combination thereof, of one or more pedestrians, the system 100 can apply OD-matrices and cluster the sub-POIs per different demographics, such as race, ethnicity, gender, age, education, profession, occupation, income level, marital status, etc., to provide useful mobility information such as average volume (count) and origin-destination at various time of the week of the mall, specific stores in the mall, specific facilities in the mall, etc. In one embodiment, the system 100 provides the mobility information to mall owners, mall operators, mall facility operators, store owners, store facility operators, marketing agencies, location-based service providers (e.g., location based targeted advertisements), or any interested third parties. In another embodiment, the system 100 provides the indoor location data, the indoor movement flows, or a combination thereof in conjunction with the demographics, instead of the mobility information. The mobility information can be anonymous, or include pedestrian identification data under pedestrian consent.

In one embodiment, the mobility information is provided to mall retailers and any other customers/users to understand mall customer preferences and mobility, such as via customer segmentation. By way of example, the mall retailers and customers/users can know which retail-stores a pedestrian from some certain region of the city (or zip code) will most likely visit when the pedestrian steps in the mall. Such in-door mobility analytics take location based services (e.g., location-based advertisements) to a new level of granularity.

Figure 2:
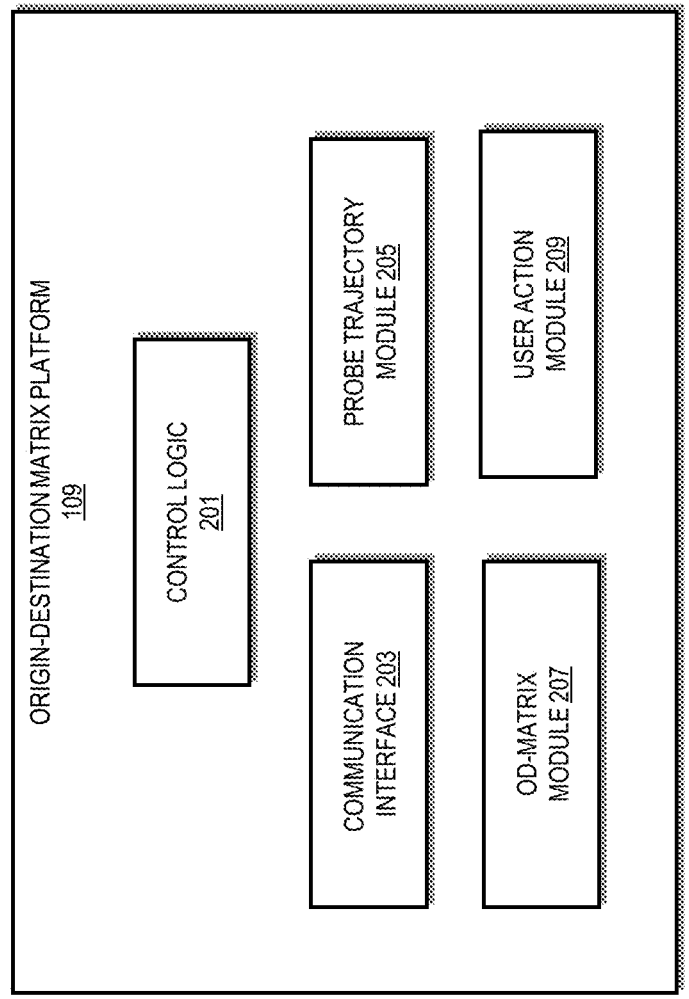
FIG. 2 is a diagram of the components of an OD-matrix platform, according to one embodiment.

As shown in FIG. 1, the system 100 comprises a user equipment (UE) 101a-101n (hereinafter, UE 101) having connectivity to an OD-matrix platform 109 via a communication network 105. FIG. 2 is a diagram of the components of an OD-matrix platform, according to one embodiment. By way of example, the OD-matrix platform 109 includes one or more components for providing an origin-destination matrix using indoor probe location data. It is contemplated that the functions of these components may be combined in one or more components or performed by other components of equivalent functionality. In this embodiment, the OD-matrix platform 109 includes a control logic (or processor) 201, a communication interface 203, a probe trajectory module 205, a OD-matrix module 207, and an user action module 209.

The control logic 201 executes at least one algorithm, software, application, and the like for executing functions of the OD-matrix platform 109. The control logic 201 may also utilize the communication interface 203 to communicate with other components of the OD-matrix platform 109, the UEs 101, a services platform 113, a content provider 117, and other components of the system 100. For example, the communication interface 203 may transmit a notification to a user's device to indicate whether the user request has been registered with one or more service providers. The communication interface 203 may further include multiple means of communication. In one use case, the communication interface 203 may be able to communicate over near field communication, SMS, internet protocol, instant messaging, voice sessions (e.g., via a phone network), or other types of communication.

The probe trajectory module 205 receives probe trajectory data from the various sensors 107 and the UEs 101 and associates this probe trajectory data with at least one subset of a plurality of sub-POIs. For example, the probe trajectory module 205 may receive probability data for a sub-POI with respect to the probability of the paths most often taken by pedestrians traveling to/from/through the sub-POI. Further, the probe trajectory data may repeat the above process of calculating probability data at a sub-POI for each sub-POI within a predetermined distance or a designated area, such as a food court, a walkway, a wing of the mall, etc. containing the sub-POI. In another embodiment, the probe trajectory module 205 may calculate the probability of travel for a series of sub-POIs. For example, the probe trajectory module 205 may calculate the probability of traffic flow for five adjacent sub-POIs.

The OD-matrix module 207 utilizes the probe trajectory data to construct OD-matrices. In one embodiment, the OD-matrix module 207 may utilize the same probe trajectory data used by the probe trajectory module 205 to create OD-matrices. In another embodiment, the OD-matrix module 207 may utilize the pedestrian movement flow calculations at a particular sub-POI or set of sub-POIs as determined by the probe trajectory module 205 in order to create OD-matrices. In yet another embodiment, the OD-matrix module 207 may use a combination of the probe trajectory data and the calculations provided by the probe trajectory module 205 to create the OD-matrices. The OD-matrix module 207 may associate traffic density with the OD-matrices it creates. In one embodiment, the OD-matrices may be associated with paths with varying lengths, wherein the lengths of the probe trajectory paths may vary based on, for example, mall map data.

In another embodiment, the user action module 209 may utilize information of a sub-POI, additional user information and sensor data collected at the sub-POI to calculate the probability of user actions (e.g., walking through, sitting down, making a quick stop, staying, meeting a friend, talking to a sale representative, purchasing, consuming, or returning a product/service, etc.) at the sub-POI. By way of example, the user action module 209 uses data collected by fixed sensors in a toy store, UE 101, and/or service platform 113, to determine that in the past month, among 100 pedestrians aged 15-20 passing via an action figure section of a toy store, 50 of them checking action figures for over 5 minutes, 25 of them walking via without any subsequent actions regarding the action figures, and 25 of them grabbing then purchasing action figures. In this case, the probability for a pedestrian aged 15-20 passing via the action figure section to check out action figures is 50%, to walk via without any other actions is 25%, and to purchase action figures is 25%.

Figure 3:
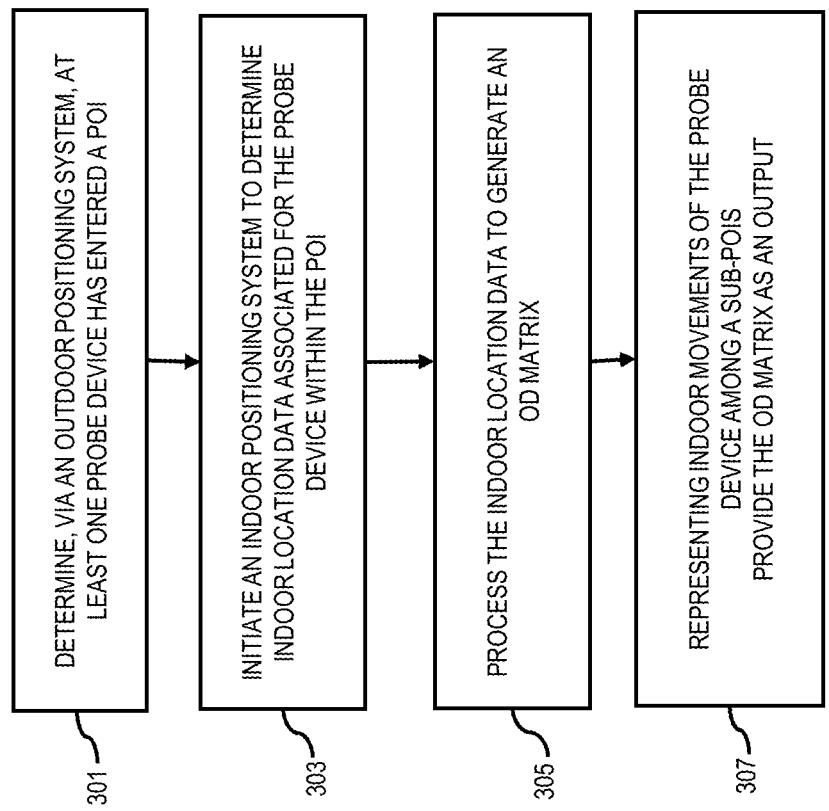
FIG. 3 is a flowchart of a process for providing an origin-destination matrix using indoor probe location data, according to one embodiment.
Figure 11:
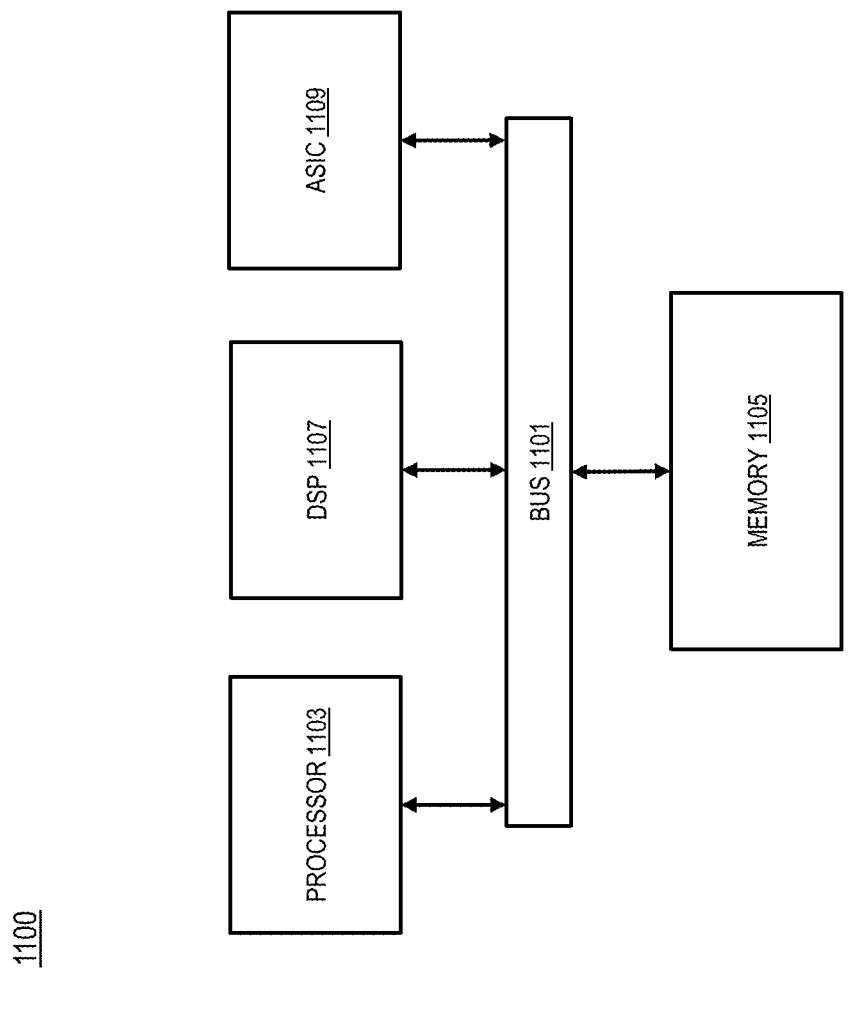
FIG. 11 is a diagram of a chip set that can be used to implement an embodiment of the invention.

FIG. 3 is a flowchart of a process for providing an origin-destination matrix using indoor probe location data, according to one embodiment. In one embodiment, the OD-matrix platform 109 performs the process 300 and is implemented in, for instance, a chip set including a processor and a memory as shown in FIG. 11.

In step 301, the OD-matrix platform 109 determines, via an outdoor positioning system (such as GPS), that at least one probe device has entered a point-of-interest (POI). In one embodiment, probe trajectory data may also be collected from cellular towers triangulation. In one embodiment, probe trajectory data may encompass camera data and survey data. Additionally, the outdoor probe trajectory data can be any data processing trajectory data, including future technologies. The probe trajectory data collected via the outdoor positioning system does not require information regarding the user's OD locations in order to be useful to the OD-matrix platform 109.

Global position system (GPS) probe data, or probe trajectory, is generally regarded to lack the quality required to build a mall wide OD-Matrix because of the GPS reception is poor indoor. On the other hand, indoor positioning sensors can trace a single probe device from its actual origin point to its destination point with respect to the probe/pedestrian ID.

In step 303, the OD-matrix platform 109 initiates an indoor positioning system to determine indoor location data associated for the at least one probe device while the at least one device is within the POI. The OD-matrix platform 109 receives probe trajectory data, wherein the probe trajectory data is associated with at least one subset of a plurality of sub-POIs. Probe trajectory data may encompass, for example, data collected from wireless access points associated with pedestrians, phones or any associated location tracking technology. Probe trajectory data may also encompass mined historical archive data collected over time using various techniques including, but not limited to, WLAN positioning methods.

WLAN positioning methods, such as Received Signal Strength (RSS), Time of Arrival (ToA), Time Difference of Arrival (TDoA), Angle of Arrival (AoA) methods, etc., provide various levels of accuracy. For example, RSS is approximately 3 to 30 meters, with an update rate in the range of few seconds. The system 100 applies different indoor positioning techniques depending on a level of accuracy required by a depth of sub-POIs (discussed later). In another embodiment, the OD-matrix platform 109 initiates a signal round-trip-time based positioning system, such as WiFi RTT.

Figure 6:
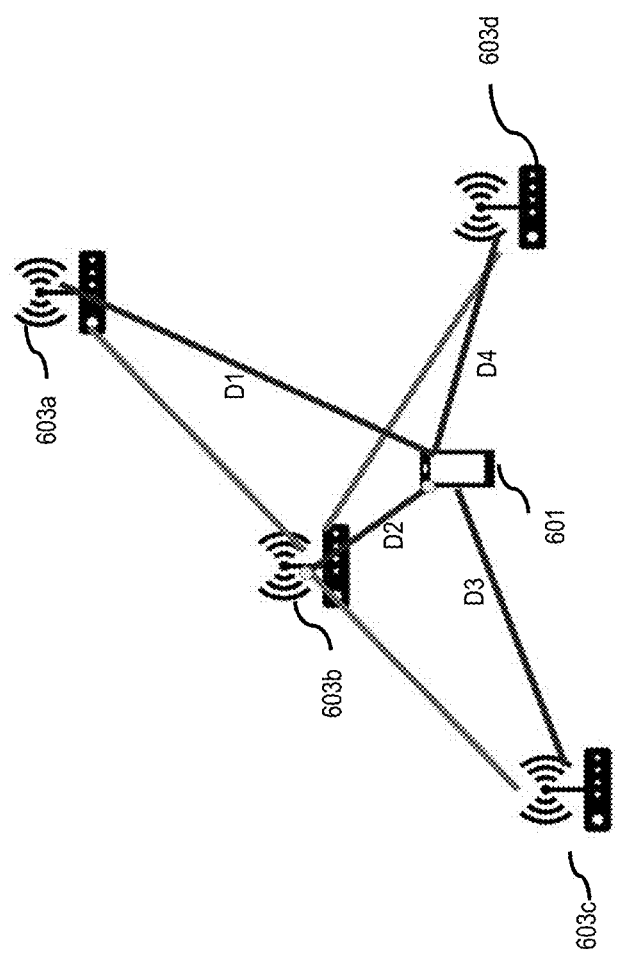
FIG. 6 shows a diagram of using WiFi RTT to determine a location of the probe device and to capture pedestrian mobility indoor, according to one embodiment.

FIG. 6 shows a diagram of using WiFi RTT to determine a location of the probe device and to capture pedestrian mobility indoor, according to one embodiment. There should be at least two wireless access points required for location estimation. The WiFi RTT technique measures the intensity of the signals received from a probe device 601 (e.g., UE 101) at wireless access points 603$a$-603$d$. The distance from each access point is acquired by measuring the round trip time (RTT) from the probe device 601 to the access point and back. This will provide distances D1-D4 from the wireless access points 603$a$-603$d$ to the probe device 601, and angles of incidence can be calculated using an Angle of Arrival (AOA) technique. The Angle of arrival (AoA) technique determines the direction of propagation of a radio-frequency wave incident on each of the wireless access points. The system 100 performs the probe device location estimation by using geometric relationships from the intersection of lines of bearing formed by a radial line to each wireless access point.

In another embodiments, the indoor probe trajectory data is collected from Bluetooth devices in addition to or in combination with wireless access points.

In step 305, the OD-matrix platform 109 processes the indoor location data to generate an origin-destination (OD) matrix, wherein the OD matrix represents an indoor movement of the at least one probe device among a plurality of sub-POIs located within the POI indicated by the indoor location data. The OD matrix is based on a count of traversal between any two of the plurality of sub-POIs indicated in the indoor location data For example, sub-POIs may encompass a store, a walkway intersection, a rest area, or any other locations in the mall which a pedestrian may decide to stop. In one embodiment, the OD-matrix platform 109 processes the probe trajectory data to construct one or more origin-destination matrices, and at least one origin-destination matrix represents one or more preferred travel paths through the subset of the plurality of sub-POIs. In another embodiment, a plurality of sub-POIs may encompass adjacent sub-POIs, and the pedestrian may request for one or more successive sub-POIs. From this information, the OD-matrix platform 109 may begin to determine the probability of a user action at each sub-POI as well as the volume of traffic traversing the sub-POI and create sequential pedestrian movement flows and information.

In one embodiment, from the information collected from the probe trajectory, the OD-matrix platform 109 may determine the volume of traffic traversing sub-POIs and deeper levels of sub-POIs. By way of example, the OD-matrix platform 109 may begin to analyze probe trajectory data of small sections within a store, such as different food sections in a supermarket, different subject sections (e.g., travel, cooking, fiction, etc.) in a bookstore, etc. The OD-matrix platform 109 may use the data from the sections to create an OD-matrix which reflects the probability at each sub-sub-POI and traffic density throughout the section. By analogy, the OD-matrix platform 109 can iteratively generates smaller OD-matrix which reflect a smaller subsection of a store section (e.g., brand name yogurt vs house brand yogurt on the product shelf), as long as there are sensitive enough fixed sensors to generate probe trajectory data that sufficiently distinguishes the positions the pedestrian with respect to a deeper level of sub-POIs to create the smaller OD-matrix. Instead of the terms of POI, sub-POI, sub-sub-POI, etc., the OD-matrix platform 109 may refer them as parent POI, child POI, grandchild POI, etc.

Figure 7A:
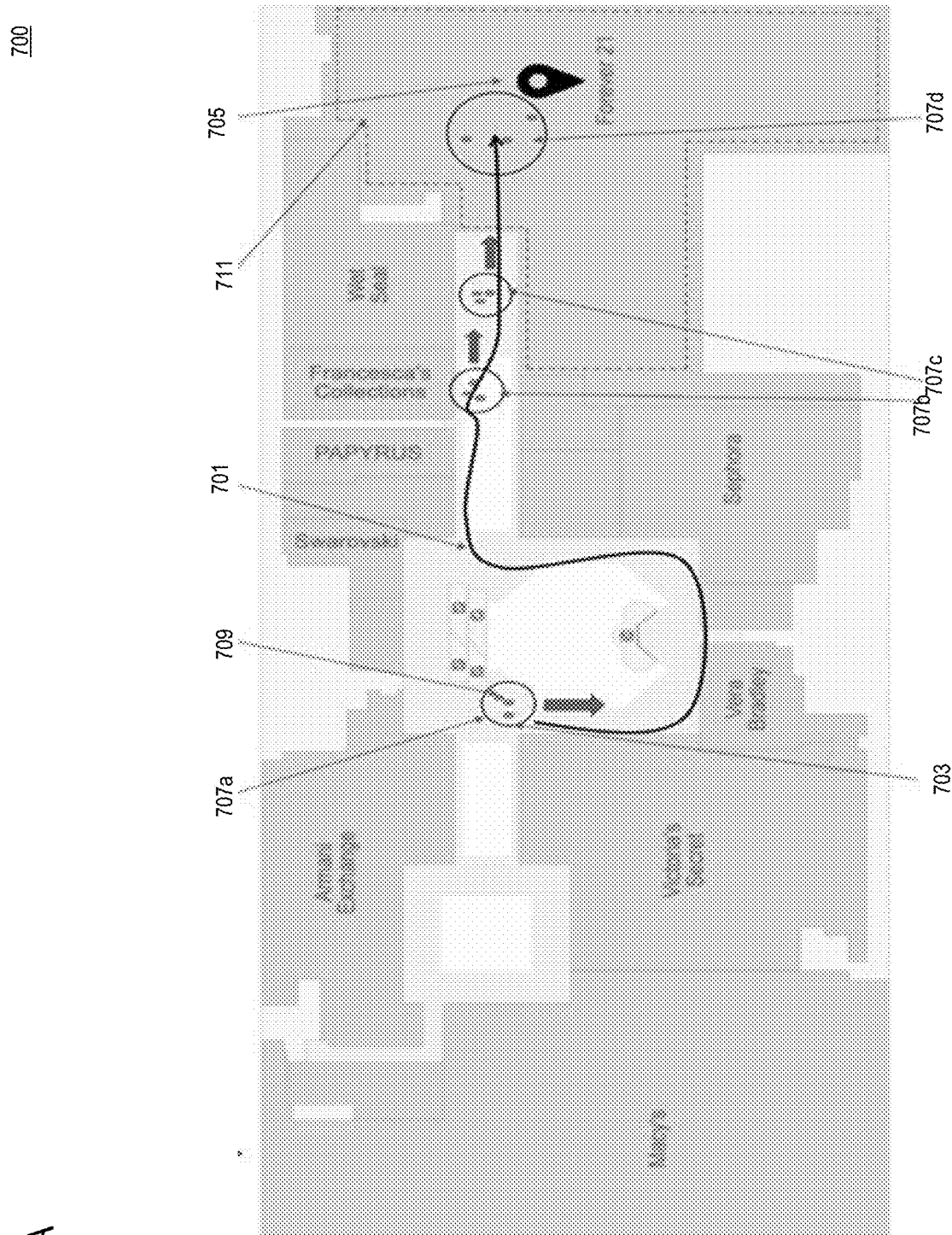
FIGS. 7A-7C show how probe trajectories are used to build a OD-matrix of a pedestrian movement flow, according to one embodiment.
Figures 7B, 7C:
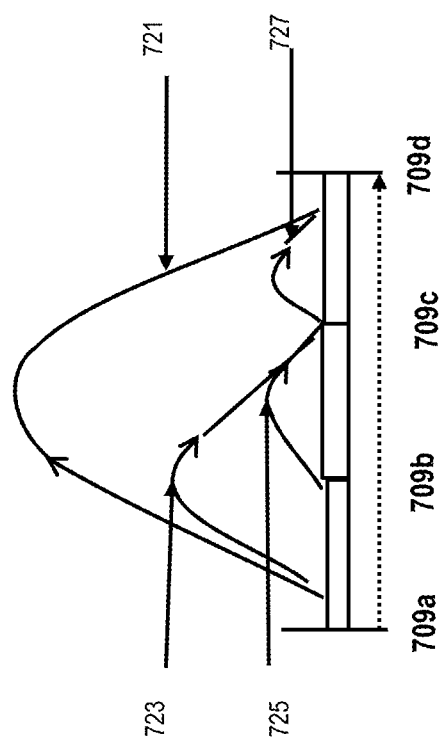

In one embodiment, the OD-matrix platform 109 determines sub-POI locations, volumes, and a direction of a pedestrian movement flow using indoor probe trajectories. FIGS. 7A-7C show how probe trajectories are used to build a OD-matrix of a pedestrian movement flow, according to one embodiment. In FIG. 7A, a map 700 shows a pedestrian movement flow 701 has an origin 703 and a destination 705. In one embodiment, the system 100 applies Round Trip Time (RTT) on indoor probe trajectories transmitted from Wi-Fi access points and a local area network, and obtains sub-POI locations 707a-707d with an accuracy of 2 meters. In one embodiment, a sub-POI is defined by a cluster based on pedestrian presence locations 709. For examples, there are three pedestrian presences at location 707a, three pedestrian presences at location 707b, three pedestrian presences at location 707c, and three pedestrian presences at location 707d. In another embodiment, a sub-POI is defined by a geofence. For example, the sub-POI 707d (which is also destination 705) is defined by a geofence 711. The cluster 707d is smaller than the geofence 711 of the corresponding sub-POI (e.g., a clothes store), thus can be defined as a sub-sub-POI in the store, such as a newly featured blue jeans section.

The OD-matrix platform 109 then applies one or more clustering algorithms on indoor probe trajectories to calculate a volume of pedestrians at each sub-POI, an average time spending therein or an average speed passing via. Each pedestrian data point found is first map-matched to an indoor-POI using the indoor map. This then produce either a cluster of pedestrian data points and/or a trajectory of data points FIG. 7A shows pedestrian data points and a probe path/flow which capture pedestrian mobility within the indoor area as sub-sub-POI and/or sub-POI using micro-ODs along the OD movement 721 (from 709a to 709d) in FIG. 7B. A general representation in a diagram 720 labels micro-ODs 723, 725, 727 in FIG. 7B, where a probe path/flow 721 is expected to have a sequential number of links in between sub-POIs on the path.

FIG. 7C has this mobility stored as an adjacency matrix 740 of all sub-POIs 709a-709c and their corresponding pedestrian mobility counts (to and from one sub-POI to the other) at various times of the day/week, can provide a deep analytics insight to pedestrian mobility indoor. The 4-sub-POIs by 4-sub-POIs matrix box shown in FIG. 7C can contain the count of the total number of times that pedestrians took from the row-sub-POI (upstream) on a row side 741 of the matrix 740 to the column-sub-POI (downstream) on a column side 743 of the matrix 740. By way of example, the OD extends from 709a to 709d with a count of 60, the micro-OD 723 extends from 709a to 709c with a count of 45, the micro-OD 725 extends from 709b to 709c with a count of 7, and the micro-OD 727 extends from 709c to 709d with a count of 5 during the day.

In one embodiment, the OD-matrix platform 109 aggregates these sub-POI matrices into a mall wide OD-matrix.

In step 307, the OD-matrix platform 109 provides the OD matrix (e.g., FIG. 7C) and/or mall wide OD-matrix as an output. In one embodiment, the OD-matrix platform 109 presents this probe trajectory data and/or OD-matrix including available OD data on a UE 101 and/or a third party terminal. In another embodiment, the OD-matrix platform 109 presents pedestrian data points, one or more probe paths/flows on UE 100 and/or the third party terminal, such as in FIG. 7A. Based on the OD-matrix, the third party terminal can select data (e.g., marketing materials, targeted advertisement, etc.) to transmit to the at least one probe device, another device, or a combination thereof.

Figure 8:
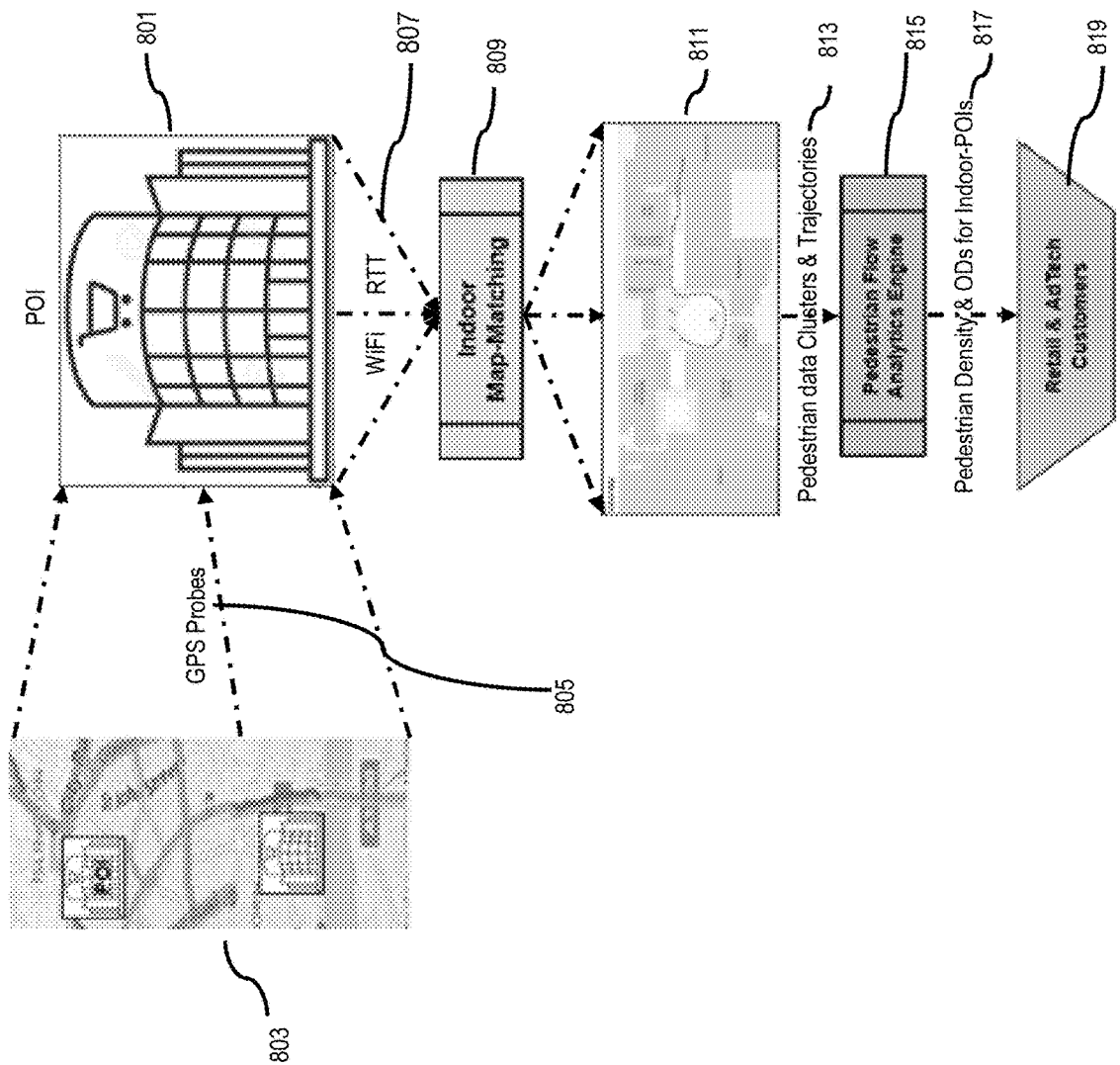
FIG. 8 is a diagram of a multiple-positioning system architecture of providing an origin-destination matrix using indoor probe location data, according to one embodiment.

FIG. 8 is a diagram of a multiple-positioning system architecture of providing an origin-destination matrix using indoor probe location data collected within a POI 801, according to one embodiment. In this case, a pedestrian is coming from outdoor to indoor of POI 801.

In FIG. 8, the multiple-positioning system architecture 800 utilizes a GPS system for outdoor positioning, a WIFI-RTT system for indoor positioning, an indoor map-matcher for generating sub-POI clusters within the POI using indoor probe trajectories based on indoor pedestrian movements. An hand-shake of two positioning systems (GPS and WIFI-RTT) is done when a pedestrian traverses from out-door to in-door, such that the mobility analytics can be captured continuously.

In one embodiment, the POI 801 is mapped first based on a map 803 using GPS probe data 805. As the pedestrian moves inside the mall to a particular sub-POI, the sub-POI is mapped to a mall floor plan based on WIFI-RTT probe data 807 via an indoor map matching process or an indoor map matcher 809, to provide a map 811 (e.g., FIG. 7A) that shows a pedestrian movement flow with an origin and a destination. In addition, a pedestrian flow analytics engine 815 uses pedestrian probe trajectories to generate sub-POI cluster counts 813 at various times of the day/week/month/season/year, for building an OD matrix of all sub-POIs 817. The pedestrian flow analytics engine 815 further generates OD interactions in between sub-POIs for various times of the day/week/month/season/year. These data sets can be published and/or sold as a content source to customers 819 or other end users. The multiple-positioning system architecture can work on offline and/or real-time data.

The multiple-positioning system architecture takes Pedestrian Flow Analytics to a new level of granularity using multiple levels of granularity (POI, sub-POI, sub-sub-POI, etc.) with positioning systems of different levels of accuracy. The GPS probe data and WIFI RTT probe data are used as examples for sensing outdoor versus indoor. As mentioned, the same approach can be used for sections within a sub-POI, sub-sections within each section, etc.

In addition, analyzing pedestrian movement flows can help the mall owner to attract new brands to open new stores and/or pop-up booths at the cluster locations (e.g., sub-POIs) where the pedestrians are mostly active, which in turn will help the new stores to attract new customers. Moreover, marketers can send targeted advertisements to specific demographics travelled via the cluster locations.

The multiple-positioning system architecture 800 can generate reality index for sub-POIs based on time spent at the sub-POIs by the number of pedestrians. This will enable location-based product/service provision as well location-based advertisement.

The processes described herein for providing an origin-destination matrix using indoor probe location data may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Returning to FIG. 1, the communication network 105 of system 100 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a GPS unit, mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The user may use one or more applications 103a-103n (hereinafter, applications 103, e.g., thematic effect applications, a map application, a location services application, a content service application, etc.) on the UEs 101. In this manner, the user may activate an application 103. The application 103 can utilize a sensor 107a-107n (hereinafter, sensors 107) to provide location and/or orientation of the UE 101. In certain embodiments, one or more GPS satellites may be utilized in determining the location of the UE 101. The UE 101 can determine a location of the UE 101, an orientation of the UE 101, or a combination thereof to present the content and/or add additional content.

By way of example, the sensors 107a-107n (hereinafter, sensors 107) may be any type of sensor. In certain embodiments, the sensors 107 are external to the UE 101 may include, for example, a camera/imaging sensor for gathering image data, an audio recorder for gathering audio data, a global positioning sensor for gathering location data, a network detection sensor for detecting wireless signals or network data, temporal information and the like. In one scenario, the sensors are indoor wireless access points in a point of interest, such as a mall. In other embodiments, the sensors 107 may be embedded in UE 101 and include location sensors (e.g., GPS), light sensors, oriental sensors augmented with height sensor and acceleration sensor, tilt sensors, moisture sensors, pressure sensors, audio sensors (e.g., microphone), or receivers for different short-range communications (e.g., Bluetooth, WiFi, near field communication, etc.).

By way of example, the UE 101, OD-matrix platform 109, and services platform 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the geographic database 111 (further described below with respect to FIG. 9) may store probability information for preferred travel paths for specific sub-POIs from the sensors 107, OD-matrix platform 109, services platform 113 and/or content provider 117, for the OD-matrix platform 109 to access at a later date. In one embodiment, the geographic database 111 may store mapping data and/or probe trajectory data, as associated with a subset of sub-POIs. In one embodiment, the probe trajectory data may include satellite-based location probe data. In one embodiment, the probe trajectory data may be collected from the sensors 107, OD-matrix platform 109, services platform 113 and/or content provider 117. In one embodiment, the geographic database 111 may store OD-matrices and its associated preferred travel paths through the sub-POIs. In one embodiment, the geographic database 111 may store aggregated OD-matrices. In one embodiment, the OD-matrix platform 109 may include and/or have access to the geographic database 111 to access and/or store information associated with the aggregated OD-matrices, OD-matrices, probe trajectory data, mapping data, preferred route data, and probability information data and/or sub-POIs data.

The services platform 113 may include any type of service. By way of example, the services platform 113 may include mapping services, navigation services, travel planning services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the OD-matrix platform 109 and the content provider 117 to supplement or aid in the processing of the content information.

By way of example, services 115 may be an location-based service that reflects preferred routes of users at various sub-POIs. In one scenario, the services 115 provide representations of each sub-POI with probability information data, associated probe trajectories, mapping data, and a variety of additional information. The services 115 allow users to access location information, activities information, contextual information, historical user information and interests within and/or outside their travel trajectories, and provides for data portability. The services 115 may additionally assist in providing the OD-matrix platform 109 with travel information of the sub-POIs.

The content provider 117 may provide content to the UE 101, the OD-matrix platform 109, and the services 115 of the services platform 113. The content provided may be any type of content, such as textual content, audio content, video content, image content, etc. In one embodiment, the content provider 117 may provide content that may supplement content of the applications 103, the sensors 107, or a combination thereof. By way of example, the content provider 117 may provide content that may process content items of interest associated with sub-POIs, various routes, OD matrices, preferred route data, probability information data, and/or mapping data. In one embodiment, the content provider 117 may also store content items associated with the UE 101, the OD-matrix platform 109, and the services 115 of the services platform 113. In another embodiment, the content provider 117 may manage access to a central repository of data, and offer a consistent, standard interface to data, such as a repository of users' navigational data content.

Figure 9:
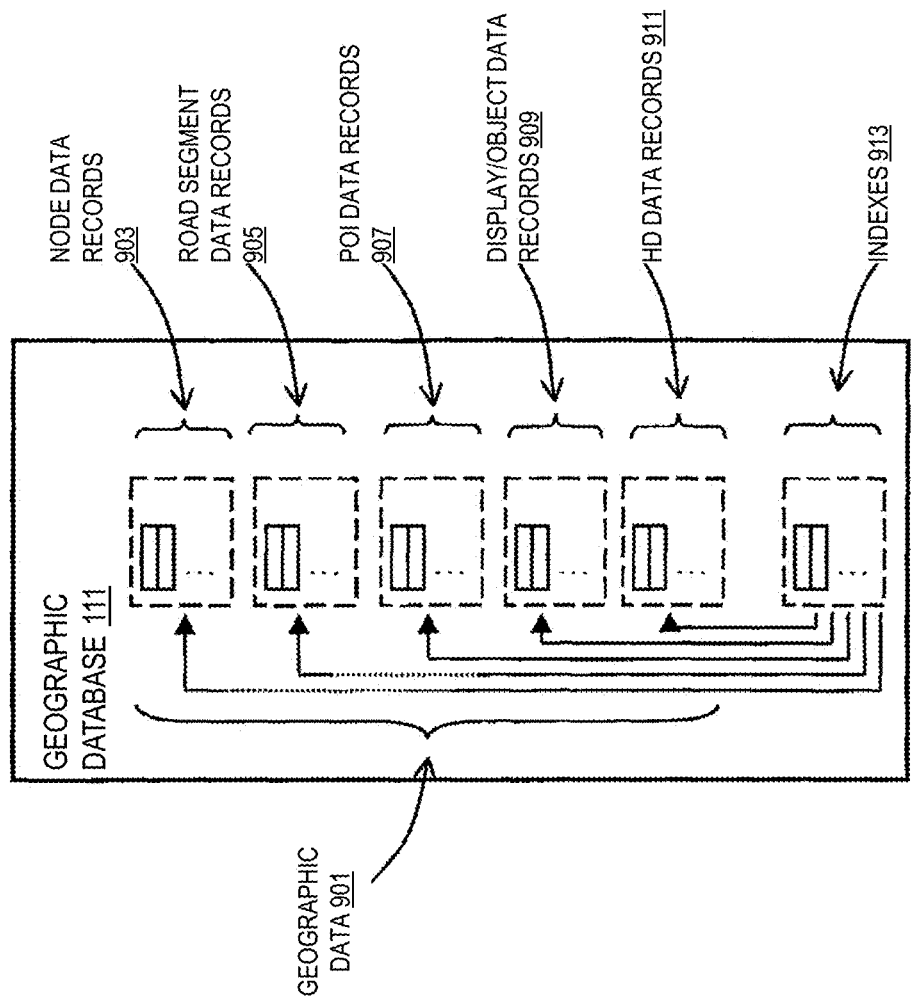
FIG. 9 is a diagram of the geographic database, according to one embodiment.

FIG. 9 is a diagram of a geographic database 111, according to one embodiment. In one embodiment, the geographic database 111 includes geographic data 901 used for (or configured to be compiled to be used for) mapping and/or navigation-related services, such as for video odometry based on the parametric representation of lanes include, e.g., encoding and/or decoding parametric representations into lane lines. In one embodiment, the geographic database 111 include high resolution or high definition (HD) mapping data that provide centimeter-level or better accuracy of map features. For example, the geographic database 111 can be based on Light Detection and Ranging (LiDAR) or equivalent technology to collect billions of 3D points and model road surfaces and other map features down to the number lanes and their widths. In one embodiment, the HD mapping data (e.g., HD data records 911) capture and store details such as the slope and curvature of the road, lane markings, roadside objects such as signposts, including what the signage denotes. By way of example, the HD mapping data enable highly automated vehicles to precisely localize themselves on the road, and to determine map data updates (e.g., learned speed limit values) to at high accuracy levels.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 111.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island).

In one embodiment, a polygon is constructed from one outer simple polygon and none or at least one inner simple polygon. A polygon is simple if it just consists of one simple polygon, or complex if it has at least one inner simple polygon.

In one embodiment, the geographic database 111 follows certain conventions. For example, links do not cross themselves and do not cross each other except at a node. Also, there are no duplicated shape points, nodes, or links. Two links that connect each other have a common node. In the geographic database 111, overlapping geographic features are represented by overlapping polygons. When polygons overlap, the boundary of one polygon crosses the boundary of the other polygon. In the geographic database 111, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the geographic database 111 is stored as a hierarchical or multi-level tile-based projection or structure. More specifically, in one embodiment, the geographic database 111 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

As shown, the geographic database 111 includes node data records 903, road segment or link data records 905, POI data records 907, display/object data records 909, HD mapping data records 911, and indexes 913, for example. More, fewer or different data records can be provided. In one embodiment, additional data records (not shown) can include cartographic ("carto") data records, routing data, and maneuver data. In one embodiment, the indexes 913 may improve the speed of data retrieval operations in the geographic database 111. In one embodiment, the indexes 913 may be used to quickly locate data without having to search every row in the geographic database 111 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points corresponding to the respective links or segments of the road segment data records 905. The road link data records 905 and the node data records 903 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 907. The geographic database 111 can also include data about places, such as cities, towns, or other communities, and other geographic features, such as bodies of water, mountain ranges, etc. Such place or feature data can be part of the POI data records 907 or can be associated with POIs, sub-POIs, sub-sub-POIs, etc. or POI data records 907 (such as a data point used for displaying or representing a position of a store in a mall).

In one embodiment, the geographic database 111 can also include display/object data records 909 for storing machine-readable visual representations and map data decoded from the visual representations and their respective properties. In addition, the display/object data records 909 can store post-processing rule sets for correcting and/or reducing the uncertainties in the display/object data decoded from clustered machine-readable visual representations. The display/object data records 909 can also store data selection rules (e.g., in a map data extension layer) for selecting from among multiple sets of readings of a machine-readable visual representation. The display/object data records 909 can also store confidence or accuracy determinations for the decoded map data. By way of example, the display/object data records 909 can be associated with one or more of the node records 903, road segment records 905, and/or POI data records 907 to support uses cases such as enhanced mapping UIs, autonomous driving, dynamic map updates, etc. In one embodiment, the display/object data records 909 are stored as a data layer of the hierarchical tile-based structure of the geographic database 111 according to the various embodiments described herein. In one embodiment, the geographic database 111 can provide the display/object data records 909 to provide an origin-destination matrix using indoor probe location data, thereby recording pedestrian movement flows.

In one embodiment, as discussed above, the HD mapping data records 911 model road surfaces and other map features to centimeter-level or better accuracy. The HD mapping data records 911 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 911 are divided into spatial partitions of varying sizes to provide HD mapping data to vehicles and other end user devices with near real-time speed without overloading the available resources of the vehicles and/or devices (e.g., computational, memory, bandwidth, etc. resources).

In one embodiment, the HD mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 911.

In one embodiment, the HD mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 111 can be maintained by the content provider 117 in association with the services platform 113 (e.g., a map developer). The map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by a probe (e.g., UE 101 or a vehicle) along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicle or UE 101. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing an origin-destination matrix using indoor probe location data using clustered machine-readable visual representations may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
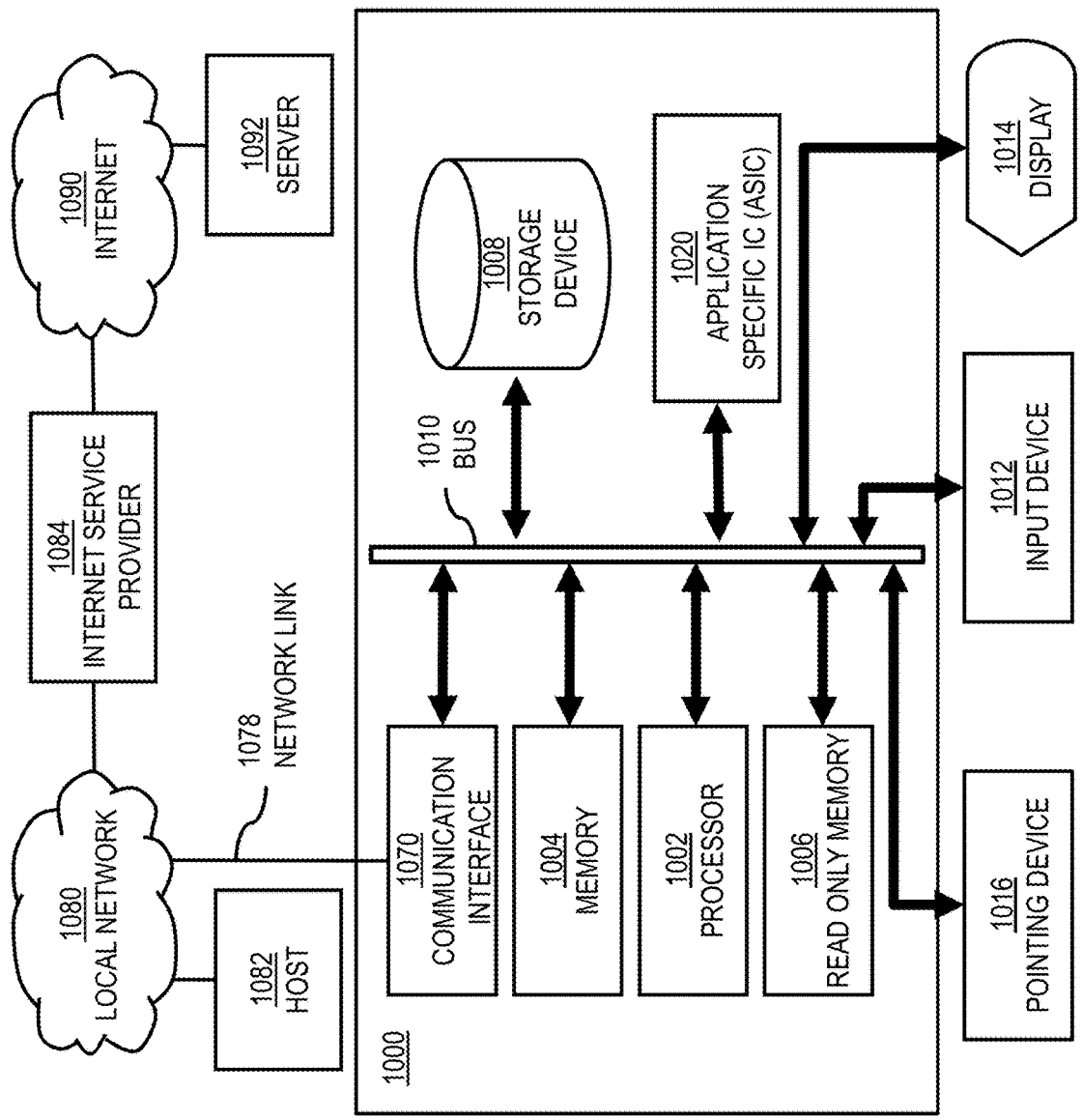
FIG. 10 is a diagram of hardware that can be used to implement an embodiment of the invention.

FIG. 10 illustrates a computer system 1000 upon which an embodiment may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to provide an origin-destination matrix using indoor probe location data as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of providing an origin-destination matrix using indoor probe location data.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to providing an origin-destination matrix using indoor probe location data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RANI) or any other dynamic storage device, stores information including processor instructions for providing an origin-destination matrix using indoor probe location data. Dynamic memory allows information stored therein to be changed by the computer system 1000. RANI allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing an origin-destination matrix using indoor probe location data, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless devices, such as mobile computers like vehicle infotainment system, the communications interface 1070 includes a radio band electromagnetic transmitter and receiver called a radio transceiver. In certain embodiments, the communications interface 1070 enables connection to the communication network 105 for providing an origin-destination matrix using indoor probe location data to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments are related to the use of computer system 1000 for implementing some or all of the techniques described herein. According to one embodiment, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the various embodiments. Thus, embodiments are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment may be implemented. Chip set 1100 is programmed to provide an origin-destination matrix using indoor probe location data as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of providing an origin-destination matrix using indoor probe location data.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide an origin-destination matrix using indoor probe location data. The memory 1105 also stores the data associated with or generated by the execution of the inventive steps.

FIG. 12 is a diagram of exemplary components of a mobile terminal 1201 (e.g., mobile computers such as vehicle infotainment system, vehicle embedded system, smartphones, etc.) for communications, which is capable of operating in the system of FIG. 1, according to one embodiment. In some embodiments, mobile terminal 1201, or a portion thereof, constitutes a means for performing one or more steps of providing an origin-destination matrix using indoor probe location data. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile computer or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile computer or a similar integrated circuit in network device (e.g., a cellular network device or data other network devices).

Pertinent internal components of the mobile terminal include a Main Control Unit (MCU) 1203, a Digital Signal Processor (DSP) 1205, and a receiver/transmitter unit. In one embodiment, wherein voice-based interaction and/or communications are supported at the mobile terminal, the mobile terminal may also include a microphone gain control unit and a speaker gain control unit. A main display unit 1207 provides a display to the user in support of various applications and mobile terminal functions that perform or support the steps of providing an origin-destination matrix using indoor probe location data. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. In embodiments supporting voice-based interactions and/or communications, an audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station (e.g., data and/or voice communications), which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, data to support providing an origin-destination matrix using indoor probe location data is formatted into network packets (e.g., Internet Protocol (IP) packets) for transmission using one or more network transmission protocol (e.g., a cellular network transmission protocol described in more detail below). In one embodiment, the network packets include control information and payload data, with the control information specifying originating/destination network addresses, error control signals, signals for reconstructing the user data from the packets, and/or other related information. In embodiments supporting voice-based interaction and/or communications, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech recognition, speech encoding, channel encoding, encrypting, and interleaving.

In one embodiment, the processed network packets and/or voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission through the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The local base station or similar component then forwards data or network packets to a gateway server (e.g., a gateway to the Internet) for connectivity to network components used for providing an origin-destination matrix using indoor probe location data. In embodiments supporting voice-based interactions and/or communications, voice signals may be forwarded from the local base station to a remote terminal which may be another mobile computer, cellular telephone, and/or any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to provide an origin-destination matrix using indoor probe location data. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details (e.g., data and/or voice subscriptions), and security information. The SIM card 1249 serves primarily to identify the mobile terminal 1201 on a radio network. The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining location data associated with a plurality of probe devices when the probe devices traverse from outside a point-of-interest (POI) to inside the POI;
   determining one or more clusters of trajectories of the probe devices based on the location data, the trajectories extending from regions outside the POI in a city to at least one of a plurality of sub-POIs located within the POI, wherein each of the regions outside the POI corresponds to a postal-code based customer segment;
   processing the one or more clusters to generate an origin-destination (OD) matrix, wherein the OD matrix represents outdoor movements of the probe devices from the regions to the POI and indoor movements of the probe devices among the plurality of sub-POIs; and
   predicting which one of the sub-POIs that one of the probe devices is likely to visit based, at least in part, on the OD matrix and one of the regions outside the POI that the one probe device travels from.

2. The method of claim 1, further comprising:
   processing the one or more clusters to determine one or more mobility patterns of the probe devices, wherein the one or more mobility patterns are with respect to the at least one of the sub-POIs.

3. The method of claim 2, wherein the one sub-POI is predicted for the one probe device further based on the one or more mobility patterns.

4. The method of claim 3, further comprising:
   selecting data to transmit to the one probe device, another device, or a combination thereof based on the OD matrix, the predicted sub-POIs, or a combination thereof.

5. The method of claim 1, further comprising:
   providing a handshake between outdoor positioning technology that determines a portion of the location data outside the POI and indoor positioning technology that determines another portion of the location data inside the POI.

6. The method of claim 5, further comprising:
   map-matching the other portion of the location data inside the POI to indoor map data to determine the indoor movements of the probe devices.

7. The method of claim 5, wherein the indoor positioning system includes a signal round-trip-time based positioning system.

8. The method of claim 1, further comprising:
   generating an index of the plurality of sub-POIs based on the OD matrix, wherein the index is based on a time spent at each sub-POI of the plurality of sub-POIs as indicated by the OD matrix.

9. The method of claim 1, wherein the OD matrix is generated with respect to at least one contextual parameter, and wherein the at least one contextual parameter includes at least in part a temporal parameter.

10. The method of claim 1, further comprising:
    processing the OD matrix to rank the plurality of sub-POIs based on popularity.

11. An apparatus comprising:
    a processor; and
    a memory including computer program code for a program, the memory and the computer program code configured to, with the processor, cause the apparatus to perform at least the following, determine location data associated with a plurality of probe devices when the probe devices traverse from outside a point-of-interest (POI) to inside the POI;

determine one or more clusters of trajectories of the probe devices based on the location data, the trajectories extending from regions outside the POI in a city to at least one of a plurality of sub-POIs located within the POI, wherein each of the regions outside the POI corresponds to a postal-code based customer segment;

process the one or more clusters to generate an origin-destination (OD) matrix, wherein the OD matrix represents outdoor movements of the probe devices from the regions to the POI and indoor movements of the probe devices among the plurality of sub-POIs; and predict which one of the sub-POIs that one of the probe devices is likely to visit based, at least in part, on the OD matrix and one of the regions outside the POI that the one probe device travels from.

12. The apparatus of claim 11, wherein the apparatus is further caused to:

process the one or more clusters to determine one or more mobility patterns of the probe devices, wherein the one or more mobility patterns are with respect to the at least one of the sub-POIs.

13. The apparatus of claim 12, wherein the one sub-POI is predicted for the one probe device further based on the one or more mobility patterns.

14. The apparatus of claim 13, wherein the apparatus is further caused to:

select data to transmit to the one probe device, another device, or a combination thereof based on the OD matrix, the predicted sub-POIs, or a combination thereof.

15. The apparatus of claim 11, wherein the apparatus is further caused to:

provide a handshake between outdoor positioning technology that determines a portion of the location data outside the POI and indoor positioning technology that determines another portion of the location data inside the POI.

16. A non-transitory computer-readable storage medium carrying one or more sequences of one or more instructions which, when executed by one or more processors, cause an apparatus to at least perform the following steps:

determining location data associated with a plurality of probe devices when the probe devices traverse from outside a point-of-interest (POI) to inside the POI;

determining one or more clusters of trajectories of the probe devices based on the location data, the trajectories extending from regions outside the POI in a city to at least one of a plurality of sub-POIs located within the POI, wherein each of the regions outside the POI corresponds to a postal-code based customer segment;

processing the one or more clusters to generate an origin-destination (OD) matrix, wherein the OD matrix represents outdoor movements of the probe devices from the regions to the POI and indoor movements of the probe devices among the plurality of sub-POIs; and predicting which one of the sub-POIs that one of the probe devices is likely to visit based, at least in part, on the OD matrix and one of the regions outside the POI that the one probe device travels from.

17. The non-transitory computer-readable storage medium of claim 16, wherein the apparatus is caused to further perform:

processing the one or more clusters to determine one or more mobility patterns of the probe devices, wherein the one or more mobility patterns are with respect to the at least one of the sub-POIs.

18. The non-transitory computer-readable storage medium of claim 17, wherein the one sub-POI is predicted for the one probe device further based on the one or more mobility patterns.

19. The non-transitory computer-readable storage medium of claim 18, wherein the apparatus is caused to further perform:

selecting data to transmit to the one probe device, another device, or a combination thereof based on the OD matrix, the predicted sub-POIs, or a combination thereof.

20. The non-transitory computer-readable storage medium of claim 16, wherein the apparatus is caused to further perform:

providing a handshake between outdoor positioning technology that determines a portion of the location data outside the POI and indoor positioning technology that determines another portion of the location data inside the POI.

\* \* \* \* \*